# United States Patent [19]

Chudgar

[11] 3,982,982
[45] Sept. 28, 1976

[54] HOSE CONSTRUCTION
[75] Inventor: Anil H. Chudgar, Manitowoc, Wis.
[73] Assignee: Imperial-Eastman Corporation, Chicago, Ill.
[22] Filed: Oct. 7, 1974
[21] Appl. No.: 512,894

Related U.S. Application Data
[62] Division of Ser. No. 269,499, July 6, 1972, Pat. No. 3,866,631.

[52] U.S. Cl............................... 156/143; 138/132; 138/144; 156/149; 156/172; 156/187; 156/244; 156/298; 156/307; 260/40 R; 428/36; 428/398
[51] Int. Cl.² ..................... B31C 5/00; B29C 27/28
[58] Field of Search ........... 156/143, 149, 172, 187, 156/244, 298, 305, 306, 307; 106/311; 252/364; 260/33.8 R, 40 R; 138/123–127, 129, 132, DIG. 7, 144; 428/36, 398

[56] References Cited
UNITED STATES PATENTS
3,382,032   5/1968   Cox.................................... 106/311
3,633,629   1/1972   Rider.................................. 138/127
3,682,201   8/1972   Atwell et al. ....................... 156/244
3,790,419   2/1974   Atwell et al. ....................... 156/149
3,861,973   1/1975   Koch................................... 156/149

OTHER PUBLICATIONS
The Condensed Chemical Dictionary–Fifth Edition, Rose, Reinhold Pub. Corp. 1956, pp. 265–266.
"Chemistry"–Watt, Hatch & Lagowski–Properties of Solutions–pp. 240–242, 1962.

Primary Examiner—Edward G. Whitby
Attorney, Agent, or Firm—Wegner, Stellman, McCord, Wiles & Wood

[57] ABSTRACT
A method of forming hose construction utilizing an aromatic polyester thermoplastic core and reinforcing means mechanically bonded about the core with the core portion in which the reinforcing means is embedded being substantially free of stress. A sheath may be provided about the reinforcing means and may be autogenously bonded to "Hytrel", an aromatic polyester thermoplastic body of material coating the reinforcing means.

12 Claims, 8 Drawing Figures

HOSE CONSTRUCTION

CROSS REFERENCE TO RELATED APPLICATION

This application comprises a division of my application Ser. No. 269,499, filed July 6, 1972, entitled "Hose Construction" and now issued as U.S. Pat. No. 3,866,631.

BACKGROUND OF THE INVENTION

1. Field of the Invention

This invention relates to an improved method of forming hose constructions wherein a tubular core is provided with a surrounding reinforcing means and selectively an outer sheath.

2. Description of the Prior Art

Aromatic polyester thermoplastic resins have found a wide range of use in modern plastic technology. Heretofore, however, no one has provided a satisfactory structural arrangement permitting the use of such thermoplastic resins as a core or sheath material in a hose construction. The use of such a core has been considered desirable because of the increased strength and flexibility which might be obtained therewith. Further, such a core would provide improved flaring facility. The hose construction could be decreased in overall dimension without impairment of fluid carrying capacity so that it would have less bulk and weight than similar other types of reinforced hoses.

SUMMARY OF THE INVENTION

The present invention comprehends such an improved method of forming such a hose construction utilizing a tubular core formed of aromatic polyester thermoplastic resin. The core defines an outer surface portion in which the reinforcing layer is embedded to have solely mechanically interlocked, retained association therewith. The polyester resin of the core surface portion in which the reinforcing layer is embedded is substantially free of stress so as to provide an improved high strength, low cost, high workability hose construction.

The hose construction may be defined by an outer sheath which is autogenously bonded to a body of such aromatic polyester thermoplastic resin carried by the reinforcing means. In one form of the invention, the core polyester resin material extends through the reinforcing means so as to define the body of plastic material to which the sheath is autogenously bonded. The material to which the sheath is bonded may have trace amounts of plasticizing means.

Thus, the invention comprehends more specifically the forming of such a hose construction by applying a suitable plasticizing agent to the outer surface of the core and applying the reinforcing means to the softened core surface portion with removal of substantially all of the plasticizing means being subsequently effected to mechanically lock the reinforcing means to the core free of stress. Thus, the reinforcing means may comprise substantially any type of material normally unaffected by the plasticizing means.

Where the core material extends through the reinforcing means to be autogenously bonded to the sheath, the core material may be provided with an increased amount of plasticizer containing a preselected amount of the thermoplastic resin, permitting it to flow through the interstices of the reinforcing layer to provide a body of the core material at the outer surface of the reinforcing layer for contact by the sheath. Thus, the sheath and core may be formed of the same aromatic polyester thermoplastic resin with the plasticizing agent effecting the autogenous bond as a result of the removal thereof after the sheath and core portions are contacted as by the extrusion of the core material onto the reinforced core.

In one form of hose construction embodying the invention, the aromatic polyester thermoplastic resin comprises "Hytrel," a proprietary product of E. I. du Pont de Nemours Co., a polycondensation product made by condensing at least one of the group of dicarboxylic acids and dicarboxylic acid ester having a molecular weight below 300 with a polyalkyline ether glycol having a molecular weight in the range of 400 to 6000 and at least one diol having a molecular weight below 250. The resin may be plasticized by any suitable solvent material including solvents in which a small percentage of the Hytrel resin is dissolved. The solvent may be removed by any conventional means including evaporation at room temperature or elevated temperature as desired, evaporation under vacuum, or by treatment with a solvent which is a nonsolvent for the resin. However, a trace amount of the plasticizing material may be retained in the surface portions to provide an improved hose construction.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
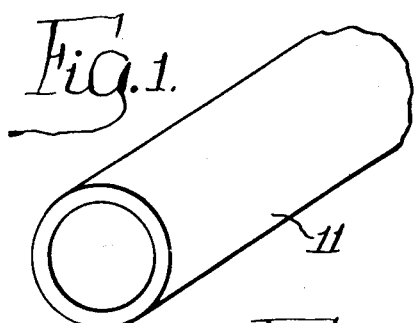
FIG. 1 is an isometric view of the end of a hose core formed of aromatic polyester thermoplastic resin embodying the invention.
Figure 3:
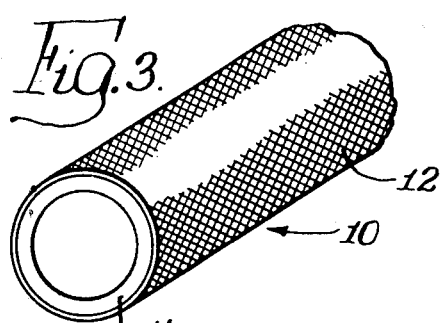
FIG. 3 is an isometric view of the end of the reinforced core defining a hose construction embodying the invention.

In the exemplary embodiment of the invention as disclosed in the drawing, a hose construction generally designated 10 is shown to comprise a tubular core 11 and an outer reinforcing layer 12. The invention comprehends that the core be formed of an aromatic polyester thermoplastic resin Hytrel with the reinforcing layer being solely mechanically interlocked with the core to provide a desired retained association therebetween. The interlocking of the reinforcing layer with the core is effected by suitably plasticizing the outer surface portion of the core prior to application of the reinforcing layer thereabout with subsequent removal of substantially all of the plasticizing material effecting a setting of the core surface portion suitably to mechanically interlock the reinforcing layer effectively positively to the core.

In one excellent form of hose construction 10 embodying the invention, the core is formed of such a polyester resin defined herein as polyester A comprising a polycondensation product made by condensing at least one group the groups of dicarboxylic acids and dicarboxylic acid ester having a molecular weight below 300 with a polyalkyline ether glycol having a molecular weight in the range of 400 to 6000 and at least one diol having a molecular weight below 250. Such a resin is marketed by the E. I. du Pont de Nemours & Co. and identified by the trademark HYTREL. Hytrel comprises a polyester elastomer which acts like a "plasticized Mylar" but wherein the plasticizer is an intrinsic part of the polymer. The elastomer is a polyethylene terephthalate in which a small percentage of ethylene diol unit is replaced by polyether glycols, which act as the plasticizer. Hytrel does not require a chemical cure and can be fabricated using common plastic processing equipment. Mechanical properties of Hytrel are as follow:

| | |
|---|---|
| Specific gravity | 1.17–1.20 |
| Flex modulus, ASTM D797 | 7000–60,000 |
| Elongation at break, ASTM D412 | 500–800 |
| Durometer hardness, ASTM D2240 | 44D, 55D, 63D |

The reinforcing layer 12 may comprise a fibrous layer formed of any suitable fibrous material, such as nylon, polyethylene terephthalates (identified by the trademark DACRON), metal filaments, etc. The reinforcing layer may be applied by any suitable means such as by spiral wrapping, braiding, etc.

It is preferred, where the reinforcing layer 12 comprises a braid, that only the fibers thereof at the inner surface of the layer be bonded to the core with the fibers outwardly thereof being free to move relative to each other, thereby providing an improved flexibility to the hose construction while yet effectively positively bonding the reinforcing layer to the core free of stress therein for improved high strength. Further, as a result of the free movement of the outer fibers of the layer 12, abrasion and wear of the fibers are effectively precluded. As the inner portion of the braid is locked to the core, the hose construction may be cut to desirable lengths without unraveling of the reinforcing layer.

Figure 2:
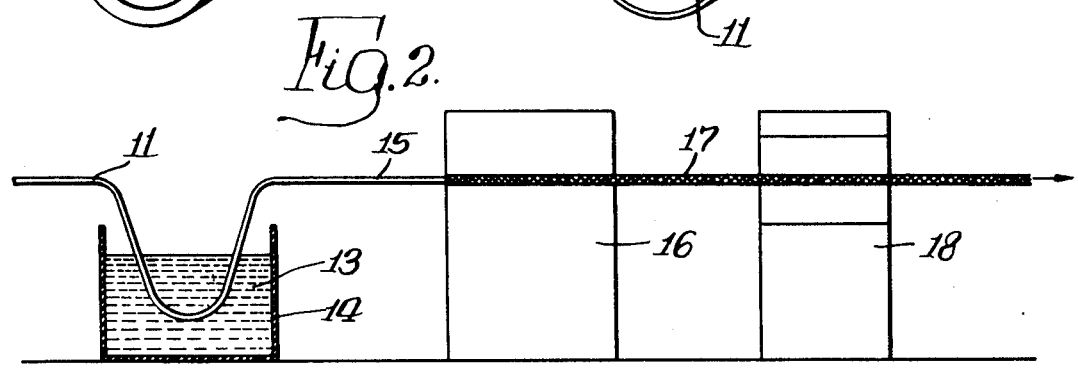
FIG. 2 is a schematic elevation of an apparatus for softening the outer surface of the hose core by treatment thereof with a suitable plasticizing agent, effecting a reinforcement of the core by application of a reinforcing layer about the softened core surface, and setting of the softened core surface portion by removal of substantially all of the plasticizing material.
Figure 4:
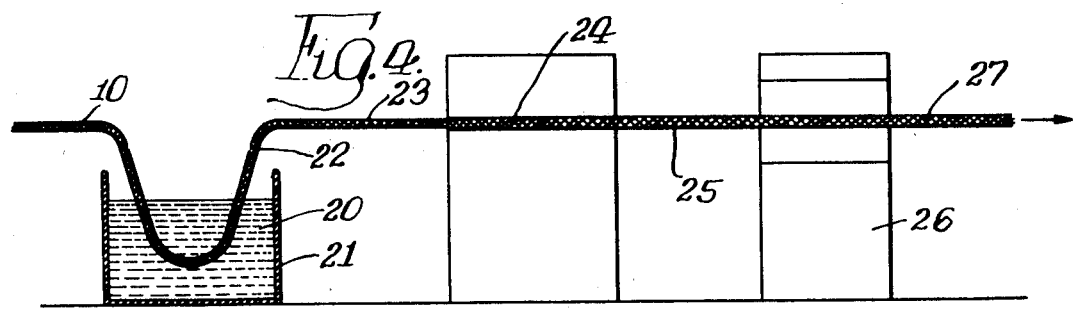
FIG. 4 is a schematic elevation illustrating the addition of a second reinforcing layer to the reinforced core.

As shown in FIG. 2, the core 11 may be treated to soften the outer surface thereof by passing the core through a suitable plasticizing liquid 13 which may be provided in a suitable tank 14. The plasticizing, or solvent, liquid may comprise suitable material, such as chloroform, low molecular weight organic acids, m-Cresol phenols dissolved in chloroform, etc. The softened-surface core 15 is then delivered to a suitable apparatus for applying the reinforcing layer which may illustratively, as shown in FIG. 2, comprise a braiding machine 16. The reinforced core 17 is then passed to a suitable apparatus 18 for removing substantially all of the plasticizing solvent to set the core surface and effect the desired mechanical bond of the reinforcing layer thereto, thereby to form the completed hose construction 10. A small, or trace, amount of the plasticizing material may remain in the outer surface portion of the core to provide an improved hose construction 10 as discussed above.

In order to prevent undesirable evaporation of the solvent material 13, it may be refrigerated. Alternatively, the viscosity of the solvent material may be increased by dissolving therein a small percentage of the resin, or similar resin, of which the core material is formed. Illustratively, a mixture of 8% of a polyester similar to the core material with 92% chloroform has been found to provide an excellent plasticizing material. Where the plasticizing solvent comprises a phenol or the like, it may be suitably heated to decrease the exposure time. As will be obvious to those skilled in the art, the depth of the softened portion of the core may be controlled by correlating the temperature and time of application of the softening material to the core surface, it being desirable to minimize the depth of the surface portion so as to maximize the strength of the resultant hose construction while yet assuring that a positive mechanical bond is effected with the reinforcing layer. As discussed above, the limitation on the depth of softening and the fluidity of the softened portion is preferably controlled so as to cause only the innermost fibers of the reinforcing braid, etc., to be embedded in the surface portion so as to permit the outermost fibers to have free movement relative to each other. The application of the braid to the softened core is preferably effected closely adjacent the softening tank to provide optimum control of the mechanical bond action. The braid may comprise a homogenous material or a mixture of fibers as desired.

Figure 5:
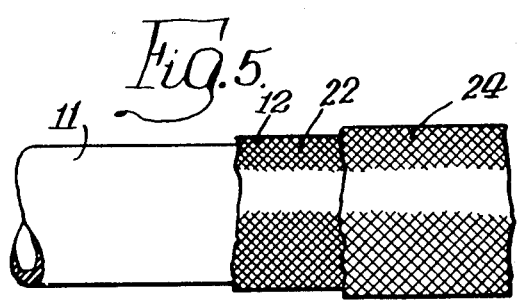
FIG. 5 is a fragmentary side elevation of a hose having two reinforcing layers as manufactured by the process of FIg. 4.

To provide such a multilayered reinforced hose construction generally designated 19, as shown in FIG. 5, the hose construction 10 may be passed through a body of plasticizing aromatic polyester thermoplastic resin dissolved in chloroform 20 in a tank 21 to effectively provide a body 22 of the thermoplastic resin at the outer surface of the reinforcing layer 12 to define a preform 23. The second reinforcing layer 24 may be applied to the preform 23 so as to be embedded in the body 22 of polyester resin and have solely mechanically interlocked, retained association therewith. Here, again, it is desirable that only the inner fibers of the reinforcing layer 24 be bonded to the underlying reinforcement layer so as to permit the outer fibers to have free relative movement therebetween for improved flexibility of the hose.

The plasticizing solvent is removed from the multilayered reinforced hose preform 25 in a suitable solvent removing apparatus 26 which may be similar to apparatus 18, to form a completed multilayered reinforced hose 27.

Figure 6:
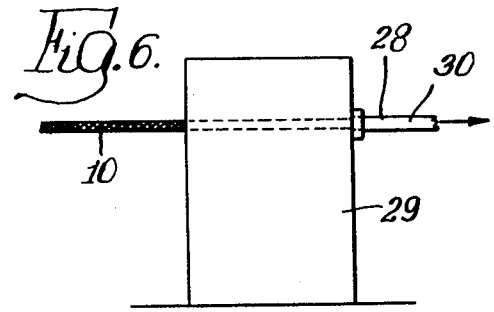
FIG. 6 is a schematic elevation illustrating a further step in forming a modified hose construction including an outer sheath.
Figure 7:
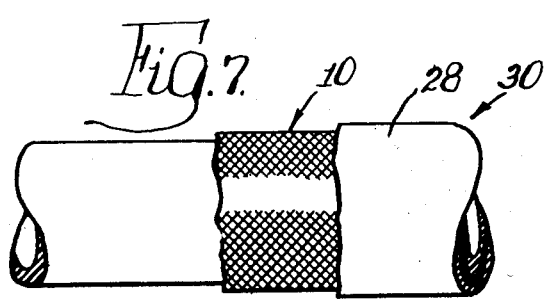
FIG. 7 is a fragmentry side elevation illustrating the sheath reinforced core hose construction.

For certain applications, it is desirable to provide an outer sheath 28 about the reinforced hose. Thus, as shown in FIG. 6, the hose construction 10 may be provided with the sheath 28 by means of an extruder 29 applying a sheath formed of the polyester resin at a high melt temperature. To effect a bonding of the sheath to the reinforcement 12, the reinforcement may be coated with a solution of the thermoplastic resin in a plasticizing solvent having the plasticizing solvent subsequently removed, such as in apparatus 26. The sheath is thereby autogenously bonded to the coating material which, in turn, is mechanicaly bonded to the reinforcement fibers. The polyster resin material may be applied to the fibers at a relatively low concentration, such as 2 to 3%, for improved penetration of the fibers, although any suitable range of concentration may be used as desired. The resultant sheathed hose 30 provides a further improved hose construction providing the highly desirable features of hose 10 with the additional external abrasion protection of the outer sheath.

As discussed above, the coating of the reinforcement may also be effectd by applying plasticizing solution containing Hytrel resin on the core sufficiently to cause the polyester resin to outwardly penetrate and saturate the reinforcement fibers. By the mechanical coating of the fibers, a strong interlock therewith is obtained which cooperates with the fusion bonding of the sheath to the coating material to provide the improved desired retained association of the sheath with the fibers.

Figure 8:
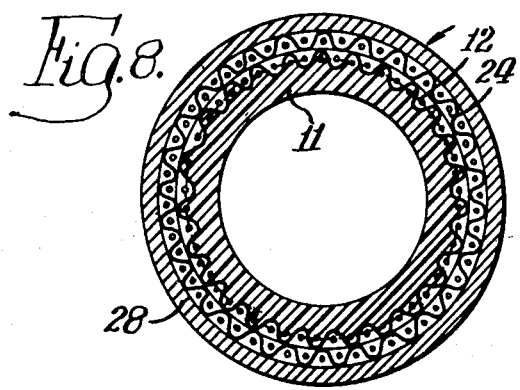
FIg. 8 is a transverse enlarged radial section of a sheathed double reinforced core hose construction.

As shown in FIG. 8, a further modified hose construction generally designated 31 is shown to comprise a sheath construction similar to hose construction 30 but wherein a plurality of reinforcing layers, such as layers 12 and 24, are provided on the core 11 prior to the application of the sheath 28. The invention is not limited ot any specific number of layers of reinforcing means. By means of the invention, the multilayered hose constructions retain the desirable qualities and characteristics of flexibility and kink resistance while yet providing high strength and long life and freedom from raveling when cut as discussed above.

The aromatic polyester thermoplastic Hytrel resin material provides improved cold temperature properties not found in conventional hose materials, such as nylon 11 and urethanes. Further, the HYTREL material provides an extremely low flex modulus as compared not only to nylon 11 and urethane material, but also other conventional thermoplastic polyester resins at lower temperature. The HYTREL material, even though not cross-linked, maintains cross-linked characteristics at elevated temperatures, such as 300° F., for improved maintained coupling retention characteristics. The Hytrel hose construction exhibits high modulus tear strength, abrasion resistance, Bashore resiliency (53–58%), good hysteresis loss and creep resistance properties, and a service temperature range of from −65° to +300°F. Hytrel is also resistant to oils, solvents, hydraulic fluids, aromatic fluids, many corrosive chemicals, hot water and microorganisms.

The foregoing disclosure of specific embodiments is illustrative of the broad inventive concepts comprehended by the invention.

I claim:

1. The method of reinforcing a hose core tube wherein reinforcing fibers are interlocked to the surface of the core tube by softening the surface of the core tube, said core tube being formed of a polycondensation product made by condensing at least one of the group of dicarboxylic acids and dicarboxylic acid ester having a molecular weight below 300 with a polyalkylene ether glycol having a molecular weight in the range of 400 to 6000 and at least one diol having a molecular weight below 250, hereinafter defined as polyester A, applying the reinforcing fibers, and setting the softened surface, said core tube surface being softened by passing the tube through a bath of polyester plasticizing means, said fibers being formed of a material unaffected by said plasticizing means, and subsequently removing the plasticizing means after the fibers are applied to effect a mechanical interlock of the fibers to said core tube.

2. The method of reinforcing a hose core tube of claim 1 wherein the plasticizing means comprises chloroform.

3. The method of reinforcing a hose core tube of claim 1 wherein additional said polyester A material is dissolved in the plasticizing means prior to passing of the tube therethrough and in a small percentage by weight suitable to increase the viscosity of the plasticizing means to prevent undesirable evaporation.

4. The method of reinforcing a hose core tube of claim 1 wherein said plasticizing means is provided with a small percentage of said polyester A material dissolved therein prior to passing of the tube therethrough.

5. The method of reinforcing a hose core tube of claim 1 wherein additional said polyester A material is dissolved in the plasticizing means prior to passing of the tube therethrough and in a small percentage by weight suitable to increase the viscosity of the plasticizing means to prevent undesirable evaporation.

6. The method of reinforcing a hose core tube of claim 1 wherein said bath is maintained at a temperature of approximately 75°–120° F.

7. The method of reinforcing a hose core tube of claim 1 wherein approximately 8–10% by weight of a polyester material is dissolved in the plasticizing means prior to passing of the tube therethrough.

8. The method of reinforcing a hose core tube of claim 1 wherein the plasticizing means includes an evaporation retardant.

9. The method of reinforcing a hose core tube of claim 1 wherein the plasticizing means includes an evaporation retardant in the amount of approximately 8–80% by weight.

10. The method of reinforcing an aromatic polyester hose core tube wherein reinforcing fibers are interlocked to the surface of the core tube by softening the surface of the core tube, applying the reinforcing fibers, and setting the softened surface, said surface being softened by passing the core tube through a bath of approximately 8–10% by weight of a polyester material dissolved in approximately 90–92% chloroform plasticizing means at approximately 75°–120°F. and subsequently removing the plasticizing means after the fibers are applied, said plasticizing means being incapable of substantially softening said fibers.

11. The method of reinforcing a polyester hose core tube of claim 10 wherein the polyester core tube is formed of a polycondensation product made by condensing at least one of the group of dicarboxylic acids and dicarboxylic acid ester having a molecular weight below 300 with a polyalkyline ether glycol having a molecular weight in the range of 400 to 6000 and at least one diol having a molecular weight below 250.

12. The method of reinforcing a polyester hose core tube of claim 10 wherein the polyester dissolved in the chloroform comprises a polycondensation product made by condensing at least one of the group of dicarboxylic acids and dicarboxylic acid ester having a molecular weight below 300 with a polyalkyline ether glycol having a molecular weight in the range of 400 to 6000 and at least one diol having a molecular weight below 250.

* * * * *